United States Patent
Neubauer, Jr.

(10) Patent No.: US 6,439,659 B1
(45) Date of Patent: Aug. 27, 2002

(54) COLLAPSIBLE PORTABLE CHAIR

(76) Inventor: James Lee Neubauer, Jr., 31425 SW. 202 Ave., Homestead, FL (US) 33030

( * ) Notice: Subject to any disclaimer, the term of this patent is extended or adjusted under 35 U.S.C. 154(b) by 0 days.

(21) Appl. No.: 09/798,160

(22) Filed: Mar. 2, 2001

Related U.S. Application Data

(60) Provisional application No. 60/186,885, filed on Mar. 3, 2000.

(51) Int. Cl.$^7$ .................................................. A47C 7/62
(52) U.S. Cl. ................ 297/188.01; 297/45; 297/188.14
(58) Field of Search ................................ 297/118, 129, 297/188.01, 188.14, 188.15, 16.1, 16.2, 56, 45, 46, 59, 440.24

(56) References Cited

U.S. PATENT DOCUMENTS

| | | | | |
|---|---|---|---|---|
| 2,379,566 A | * | 7/1945 | Duke ........................... | 297/45 |
| 3,077,327 A | * | 2/1963 | Batie et al. .......... | 297/188.01 X |
| 4,042,250 A | * | 8/1977 | Rodaway .................... | 297/45 X |
| 4,105,244 A | * | 8/1978 | Colby .......................... | 297/45 |
| 5,350,215 A | * | 9/1994 | DeMars ................. | 297/188.14 |
| 5,409,291 A | * | 4/1995 | Lamb et al. ........ | 297/188.14 X |
| 5,582,458 A | * | 12/1996 | Wildt ................. | 297/188.01 X |
| 5,873,624 A | * | 2/1999 | Simpson ....................... | 297/45 |
| 6,042,180 A | * | 3/2000 | Lombardi .......... | 297/188.01 X |
| 6,082,813 A | * | 7/2000 | Chen ...................... | 297/16.1 X |

* cited by examiner

*Primary Examiner*—Peter M. Cuomo
*Assistant Examiner*—Stephen Vu
(74) *Attorney, Agent, or Firm*—Robert M. Downey, P.A.

(57) ABSTRACT

A chair is provided with a corrosion resistant tubular frame structure including a left frame member, a right frame member and pivoting cross arms fitted to the left and right frame members and operable in a scissor action to permit lateral movement of the left and right frame members between a collapsed position and a separated operable. position. Flexible, weather-resistant material panels attached between the left and right frame members provide a seat base and back rest which are pulled taut to support a person seated in the chair when the frame members are separated in the operable, open position. Side pockets of varying size and shape are provided on overhanging flaps on opposite, outboard sides of the chair. The chair is further provided with integrated accessory holders including a cup holder, an umbrella holder, a fishing rod holder, and a shoulder strap to facilitate transport of the collapsed chair.

17 Claims, 2 Drawing Sheets

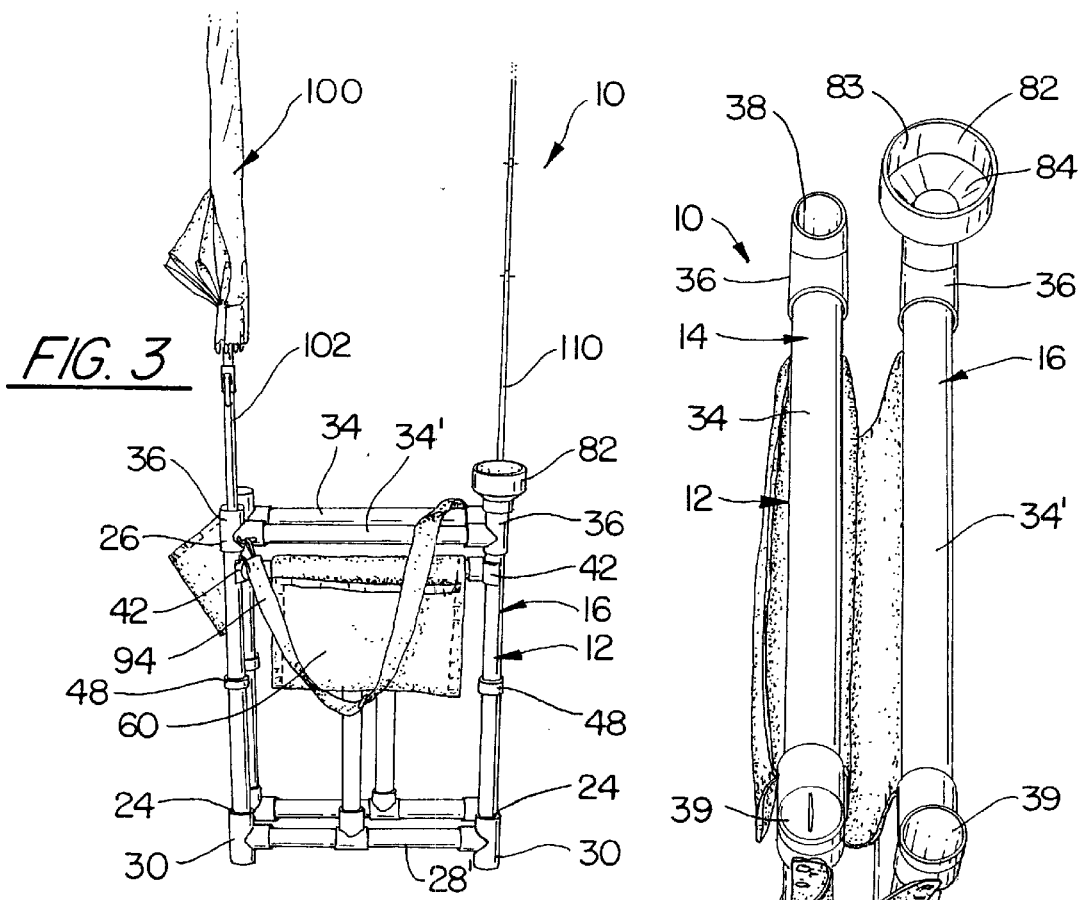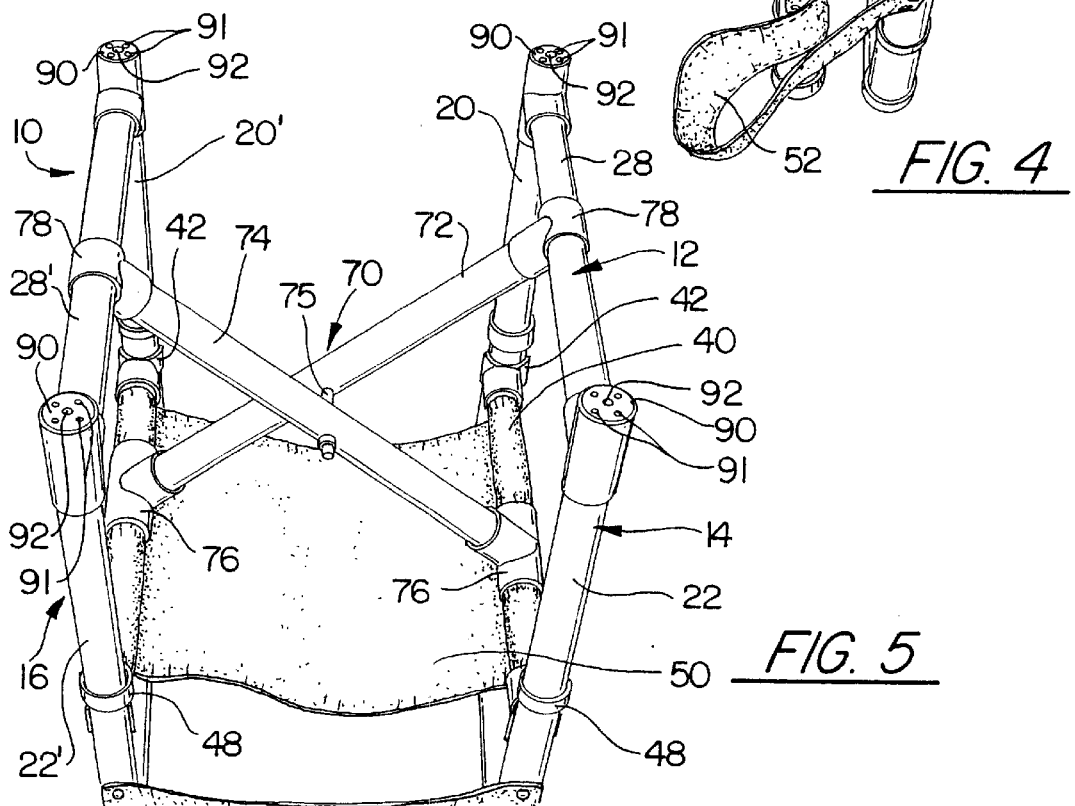

COLLAPSIBLE PORTABLE CHAIR

This application claims the benefit of provisional application 60/186,885 filed Mar. 3, 2000.

BACKGROUND OF THE INVENTION

1. Field of the Invention

The present invention relates to a collapsible, portable chair and, more specifically, to a lightweight, weather-resistant chair having left and right frame members which move laterally, by scissor action, between a collapsed position and an extended, operable position, with a foldable seat base and back rest extending therebetween, and wherein the structure of the seat frame provides means for holding an umbrella, a beverage, and a fishing rod.

2. Description of the Related Art

The art is crowded with all types of collapsible chairs, such as beach and lawn chairs, which are specifically adapted for ease of transport when going to the beach, the park, a parade, or the like. In most instances, collapsible, portable chairs of this nature are constructed to fold from front to rear with the seat base maintained relatively low to the ground. Typically, portable collapsible chairs, such as beach chairs, include a frame structure formed of lightweight aluminum tubing and a seat back and seat base formed of a nylon or plastic mesh material which is wrapped about the aluminum tubing and stitched to itself along a seam. For the most part, these chairs are not very sturdy and, therefore, have little capacity for holding or supporting a combination of objects such as umbrellas, fishing roads, magazines, beverages, etc., especially when the user removes his/her weight from the chair. While provision has been made to attach an umbrella or other accessories to some collapsible chairs, additional hardware is needed and the accessories must be removed to collapse and carry the chair. Furthermore, many of the collapsible chairs known in the art have problems resisting deterioration from exposure to salt water, sand, rain, and sunlight. In particular, the frame structure and hardware become corroded over time and the threads of the fabric separate, especially near the stitched seam. Additionally, when collapsed, most beach chairs are unable to stand on their own. Most people lean the collapsed chair against a wall or car when gathering and loading or unloading their belongings. On occasion, the chair may fall and scratch the car or wall surface. It is further undesirable to have to bend down to pick up the collapsed chair from the ground, particularly when a person's hands are full.

Accordingly, there exists a need for an improved, durable, multi-purpose collapsible and portable chair which is adapted to support a person in a comfortable seated position and which includes means for accommodating a variety of articles and accessories as an integral part of the frame structure, including a cup holder, an umbrella holder, a fishing rod holder, and pockets for containing magazines, books, sunglasses, sun tan lotion, and the like, thereby enabling transport of the collapsed chair and accessories as an integral unit.

SUMMARY OF THE INVENTION

The present invention is directed to a collapsible chair having a corrosion resistant tubular frame structure including a left frame member and a right frame member supported in parallel relation and laterally moveable relative to one another between a collapsed position and an open, operable position. The frame members each include a forward vertical post and a rear vertical post, defining legs of the chair. The forward and rear leg posts are disposed in spaced, parallel relation to one another and include bottom distal ends and top distal ends. A lower horizontal support extends between and attaches to the forward and rear leg members adjacent the bottom distal ends. An upper horizontal support extends between and attaches to the upper distal end zones of the forward and rear leg members to define an arm rest on each side. The frame members further include slide bars which extend between the forward and rear leg posts. Glides on the opposite ends of the slide bars permit sliding movement of the slide bars between the upper distal end zone and a stop ring on an intermediate portion of the forward and rear legs. A seat base and back rest formed of a flexible weather-resistant material span between the left and right frame members. Specifically, the back rest attaches to the upper portion of the respective rear leg posts of the left and right frame members, and the seat base attaches to the respective slide bars of the left and right frame members.

The chair further includes means for permitting lateral movement of the parallel positioned left and right frame members between the collapsed position and the open, operable position. Specifically, cross bars fitted to the left and right frame members, below the seat base, pivot about a central pin or bolt in a scissor action to permit lateral movement of the frame members towards and away from one another between the collapsed position and the open position, while maintaining the frame members parallel. The cross bars pivotally attach at upper ends to the slide bars. The lower ends of the cross bars are provided with slip rings to provide a rotating coupling to the lower horizontal supports of the frame members. In the operable position, the seat base and back rest are pulled taut to support a person seated in the chair. A cup holder, umbrella holder, and fishing rod holder are provided on the upper distal end zones of the vertical legs. Side pockets of various size and shape are provided on flaps attached to the horizontal seat supports. The flaps extend and overhang on opposite outboard sides of the chair. A shoulder strap removably attaches to the upper portion of one of the frame members to facilitate transport of the collapsed chair. The shoulder strap can also be used as a leash for a dog or small child in a harness, with one end of the strap remaining attached to the chair.

Plastic disks on the bottom distal ends of the front and rear leg posts provide ground engaging feet to protect the frame structure against wear on rough surfaces. The disks include drain holes and a central aperture for attaching coasters (wheels) to the bottom of the chair. It is noted that the drain holes permit the hollow frame structure to be filled with water so that the chair does not float when used for fishing or lounging in shallow water. When removed from the water, the fluid in the frame structure conveniently and efficiently empties through the drain holes in the feet.

OBJECTS AND ADVANTAGES OF THE INVENTION

It is a primary object of the present invention to provide a collapsible portable chair which is constructed of corrosion-resistant, durable materials, and which is adapted to hold a variety of articles and accessories on the frame structure of the chair.

It is a further object of the present invention to provide a collapsible portable chair which is easy to transport, with articles and accessories attached thereto, such as, but not limited to, an umbrella, a fishing rod, a beverage, and articles such as books, sunglasses, sun tan lotion and the like carried in pockets on the chair.

It is still a further object of the present invention to provide a collapsible portable chair formed of durable, corrosion-resistant material which is structured to stand up when collapsed, and loaded with attached accessories such as one or two umbrellas, a fishing rod, beverage, books, sunglasses, sun tan lotion and the like.

It is still a further object of the present invention to provide a collapsible portable chair formed of durable, corrosion-resistant material, and wherein the frame structure of the chair is adapted to fill with water so as to sit within a shallow body of water without floating.

It is still a further object of the present invention to provide a collapsible portable chair, as described above, which includes drain means for draining water filled within the frame structure.

It is still a further object of the present invention to provide a collapsible portable chair, formed of durable, corrosion-resistant material, and wherein the chair is easily operable between a closed, collapsed position and an open position with the use of one hand.

It is still a further object of the present invention to provide a collapsible portable chair which may be provided with wheels or coasters to facilitate ease of transport, either in a collapsed position or in an open position, with various accessories and articles fitted to the chair.

It is yet a further object of the present invention to provide a collapsible portable chair which includes a shoulder strap for carrying the chair, and wherein the shoulder strap further serves as a leash for securing an animal or small child when the user is seated in the chair.

These and other objects and advantages of the invention will be more readily apparent with reference to the accompanying drawings and the detailed description.

BRIEF DESCRIPTION OF THE DRAWINGS

For a fuller understanding of the nature of the present invention, reference should, be made to the following detailed description taken in conjunction with the accompanying drawings in which:

FIG. 3 is a side perspective view of the chair shown in a collapsed position;

FIG. 4 is a top perspective view of the chair shown in the a collapsed position; and FIG. 5 is a bottom perspective view of the chair shown in an open position, with the chair inverted.

Like reference numerals refer to like parts throughout the several views of the drawings.

DETAILED DESCRIPTION OF THE PREFERRED EMBODIMENT

Figures 1, 2:
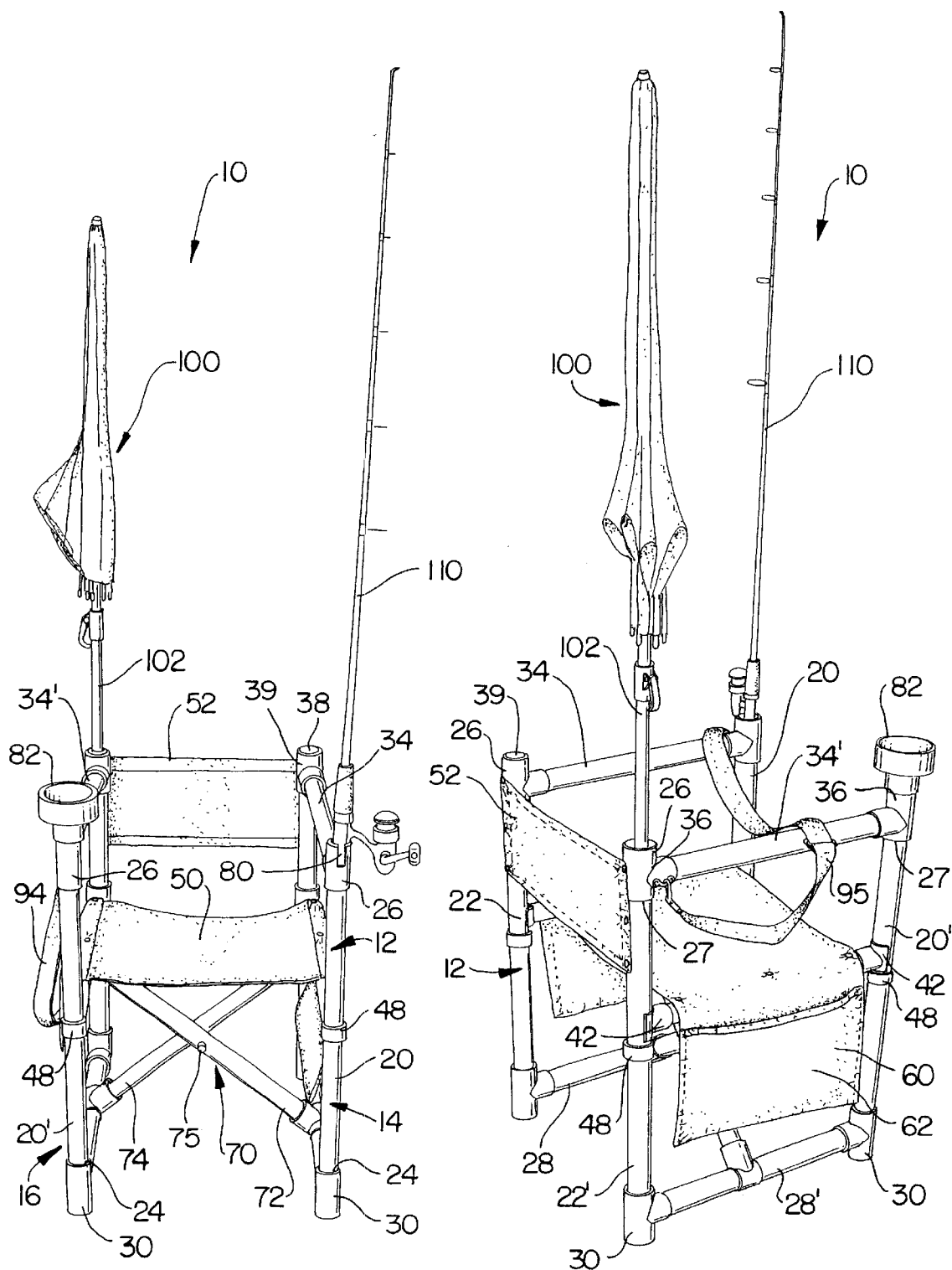
FIG. 1 is a front perspective view of the collapsible, portable chair of the present invention.
FIG. 2 is a rear perspective view of the collapsible, portable chair.

Referring to the several views of the drawings, the collapsible portable chair of the present invention is shown and generally indicated as 10. The chair 10 includes a frame structure 12 including a left frame member 14 and a right frame member 16 supported in parallel relation and laterally movable relative to one another between a collapsed position and an open, operable position. The frame members 14, 16 each include a forward vertical post 20, 20' and a rear vertical post 22, 22' defining legs of the chair. The forward and rear leg posts 20, 20', 22, 22' are disposed in spaced, parallel relation to one another and include bottom distal ends 24 and top distal ends 26. Lower horizontal supports 28, 28' extend between and attach to the forward and rear leg members of the respective left and right frame members 14, 16, with the use of T connectors. Specifically, the opposite ends of the lower horizontal supports 28, 28' are fixed to T-shaped couplings 30. Likewise, the forward and rear leg posts are secured to a vertically oriented section of the T-shaped couplings 30, as seen throughout the several views of the drawings. Attachment to the T-shaped couplings 30 may be achieved with the use of a suitable adhesive, such as a plastic epoxy and/or with the use of hardware, such as stainless steel screws.

Upper horizontal supports 34, 34' attach to and extend between the upper distal end zones 27 of the forward and rear leg members to define an arm rest on each side of the chair. Similar to the lower horizontal supports, the oppositely disposed upper horizontal supports 34, 34' attach at opposite ends to a T-shaped coupling 36 fitted to the upper distal end zones of the respective forward and rear leg members and are fixed thereto with the use of an adhesive and/or hardware, such as stainless steel screws. The top end 38 of the T-shaped couplings 36 are hollow, in open communication with the hollow interior of the forward and rear leg members. In this manner, a pole, such as the shaft 102 of an umbrella 100, or a fishing rod 110, may be inserted through the open top 38 of the T-shaped couplings 36 and down through at least a portion of the length of the forward or rear leg members. To provide a secure, snug fit, the top open ends of the upper T-shaped couplings may be provided with plastic or rubber caps 39 having a slit or opening therein for frictional engagement with the shaft 102 of the umbrella 100 or other article fitted therethrough. This serves to provide resistance against the umbrella shaft lifting up and pulling out of the open top of the leg members in windy conditions.

The left and right frame members 14, 16 further include slide bars 40, which extend between the front and rear leg posts. The opposite ends of the slide bars are fitted with glides 42 which include a generally C-shaped portion that is sized and configured for loose fitting engagement about a portion of the outer cylindrical surface of the respective forward and rear leg posts, thus permitting sliding movement of the glides along the exterior of the leg posts. Alternatively, the C-shaped portion can be configured for engagement with the inner cylindrical surface of the leg posts. A stop collar 48 is fitted to each of the forward and rear leg posts to limit downward movement of the glides 42 and attached slide bars 40 along the front and rear leg posts of the respective left and right frame members. The stop collars 48 may be adjustably positioned on the forward and rear leg posts to vary the height of the seat base 50 when the chair is open.

The seat base 50 and a back rest 52 are formed of a flexible, weather-resistant material such as, for example, a plastic coated nylon weave or mesh material. The seat base 50 and back rest 52 are secured to the left and right frame members 14, 16 so that when the chair 10 is open, the seat base 50 and back rest 52 are pulled substantially taut to support the weight of a person seated thereon. Specifically, the back rest 52 is secured to the upper portion of the rear leg posts, as seen in FIG. 2. Attachment of the back rest to the rear leg post may be achieved with the use of stainless steel hardware, such as screws, rivets, or like fastening elements. Likewise, the seat base 50 is secured to the slide bars 40 of the left and right frame members. Specifically, the flexible material of the seat base may be wrapped about the slide bars and fastened thereto with the use of stainless steel hardware, much like the seat back. The chair may further be provided with flaps 60 extending from opposite sides of the chair, and fastened to the slide bars 40 for providing pocket means 62. The pockets 62 formed in the side flaps may be of various size and configuration to accommodate various articles such as, but not limited to, magazines, books, sunglasses, sun tan lotion, small towels, purses, wallets and the like.

The chair 10 further includes means 70 for permitting lateral movement of the parallel position left and right frame members between the collapsed position and the open, operable position. Specifically, cross bars 72, 74 fitted to the left and right frame members 14, 16, below the seat base 50, pivot about a central pin or bolt 75 in a scissor action to allow lateral movement of the left and right frame members 14, 16 towards and away from one another between the collapsed position and the open position, while maintaining the frame members 14, 16 in parallel relation to one another. The cross bars 72, 74 attach at an upper end to the slide bars 40. Specifically, the upper ends of the cross bars are fitted with a generally U-shaped brace member 76 which wraps partially about the respective slide bar 40 and the seat base material. The U-shaped brace 76, which is formed of a half section of the tubular frame material, is of a sufficient diameter to wrap about the seat base material and the slide bars and is secured in place with the use of stainless steel screws or like fastening elements. The length of the U-shaped brace 76 may vary from a few inches to the entire length of the slide bars between the opposite T-shaped couplings.

The lower ends of the cross bars 72, 74 are provided with slip rings 78 for rotating coupling to the lower horizontal supports 28, 28' of the left and right frame members. Similar to the U-shaped braces 76 on the upper ends of the cross bars 72, 74, the slip rings 78 may vary in length from a few inches to the entire length of the lower horizontal supports between the T-shaped couplings 30 at the opposite ends. In the embodiment shown in the drawings, the slip rings 78 are approximately 3 to 4 inches long and they are maintained in place on the lower horizontal supports with the use of stainless steel screws fitted to the horizontal supports on opposite sides of the slip ring. This prevents unwanted forward and rear movement of the slip ring along the horizontal supports. Alternatively, the slip rings 78 can be made to extend the full length of the horizontal support to prevent forward and rearward movement.

The hollow nature of the forward 20, 20' and rear 22, 22' leg posts of the frame structure 12 provide an ideal means to accommodate an elongate pole or like article, such as an umbrella shaft 102 or fishing rod 110, as mentioned above. In the embodiment shown throughout the drawings, one of the forward leg posts 20 or 20' is used to accommodate a fishing rod 110 therein. The top T-shaped coupling 36, on the forward leg post, may be provided with a notch 80 for receipt of a portion of the fishing reel, thus preventing rotation of the fishing rod once seated in position within the forward leg post.

The opposite forward leg post 20 or 20' may be provided with a beverage holder 82, as seen throughout the several views of the drawings. Specifically, the beverage holder 82 is defined by a generally funnel-shaped structure formed of the same material as the frame structure of the chair. The beverage holder 82 securely fits to the top end of the T-shaped coupling 36 and may be secured in place with the use of adhesive or stainless steel screws. The beverage holder 82 includes an annular retaining collar 83 which surrounds a dish portion 84 for seating a beverage therein, such as an aluminum can, a bottle or a cup. The inside bottom of the beverage holder is opened and communicates with the open hollow interior of the front leg post, so that condensation or other liquid dripping from the beverage drains down through the leg post.

The bottom, ends of the front and rear leg posts are provided with disk-shaped feet 90 formed of a plastic material. The feet are provided with drain holes 91 and a central aperture 92 to accommodate releasable attachment of wheels or coasters thereto. The hollow nature of the frame structure allows water to be filled within the chair so that the chair does not float in shallow water. This enables the chair to be used when fishing or lounging near the shoreline or in a shallow swimming pool. When the chairs are moved from the water, the fluid in the frame structure conveniently and efficiently empties through the drain holes 91 on the bottom of the leg posts.

A shoulder strap 94 is provided to facilitate carrying of the chair. The shoulder strap is formed of a 2–3 inch wide, woven material, similar to a seatbelt strap, which comfortably rests on the top of the shoulder of the person carrying the chair. The wide, relatively soft nature of the shoulder strap 94 prevents the strap from cutting into the wearer's shoulder, particularly when the chair is loaded up with accessories. The shoulder strap 94 is provided with adjustment fittings 95 to vary the length thereof. The opposite ends of the shoulder strap are provided with clips for releasable attachment to fittings on the upper T-shaped couplings of the left and right arm rests. When seated, the user can disconnect one end of the shoulder strap 94 and attach it to the collar of a dog or cat, so that the animal does not wander from the owner. This is particularly useful for public places, wherein dogs and cats are not permitted to run freely without a leash. Alternatively, the shoulder strap may be used to secure a small child, wearing a harness, to the chair so that the child does not wander into hazardous areas, such as a swimming pool, the ocean, a road, parking lot, etc.

The structure of the chair 10 provides for ease of opening and collapsing with use of one hand. Specifically, the chair 10 can be opened easily by simply pushing down on either of the slide bars 40, which causes the cross bars 72, 74 to scissor outwardly to move the left and right frame members 14, 16 laterally away from one another. Likewise, the chair 10 can be easily closed with one hand by grasping the seat base 50 in the middle and lifting upwardly, to pull the left and frame members 14, 16 towards one another. When the chair 10 is in the open position, there is no need for locks to secure the cross bars 72, 74 or left and right frame members open. In the collapsed position, the chair 10 is able to stand upright on its own, fully loaded (i.e., with umbrella, fishing rod, articles in pockets. etc.).

While the instant invention has been shown and described in accordance with practical and preferred embodiments thereof, it is recognized that departures from the instant disclosure are contemplated within the spirit and scope of the invention as set forth in the following claims and as interpreted under the doctrine of equivalents.

What is claimed is:

1. A portable chair comprising:
   a corrosion-resistant frame structure formed of a plurality of hollow tubular sections and comprising:
     a left frame member;
     a right frame member;
     said left and right frame members each including a
        forward vertical leg post and a rear vertical leg post, and said forward and rear vertical leg posts of said left and right frame members each terminating at a bottom distal end; and movement means for permitting lateral movement of said left and right frame members relative to one another between a collapsed position and an open, operable position wherein said frame members are positioned further apart from one another than when in said collapsed position, and said movement means being structured to maintain said left and right frame members in parallel relation to one another in both said collapsed position and said open, operable position;

disk-shaped feet members on said bottom distal ends of each of said forward and rear vertical leg posts, said disk-shaped feet members being structured and disposed to engage an underlying ground surface in a manner which supports said frame structure in an upright, free-standing position when said left and right frame members are in both said open, operable position and said collapsed position;

a seat base formed of a flexible material web and connecting between said respective left and right frame members, said seat base being structured to be pulled substantially taut when said left and right frame members are in said open, operable position in order to support a person seated thereon;

a seat back panel formed of a flexible material web and connecting between said left and right frame members above and generally perpendicular to said seat base, said seat back being structured to be pulled substantially taut when said left and right frame members are in said open, operable position in order to support the person's back when seated on said seat base;

umbrella support means on said frame structure for supporting at least one umbrella in an upright, operable position;

fishing rod support means on said frame structure for holding and supporting at least one fishing rod;

beverage holder means on said frame structure for holding a beverage; and drain means for facilitating drainage of water from within said hollow tubular sections of said frame structure.

2. The portable chair as recited in claim 1 wherein said movement means comprises:

first and second cross bars pivotally connected at a central pivot axis and movable in a scissor action about said pivot axis, said first and second cross bars including lower distal end zones and upper distal end zones;

left and right seat support bars each extending between said forward vertical leg post and said rear vertical leg post of said respective left and right frame members, and said left and right seat support bars being slidable throughout a range of vertical motion relative to said forward and rear vertical leg posts;

pivotal coupling means for pivotally connecting said upper distal end zones of said respective first and second cross bars to said left and right seat support bars, respectively;

rotating coupling means for rotatably coupling said lower distal end zones of said respective first and second cross bars to said left and right frame members, respectively; and said seat base being attached to said left and right seat support bars so that upon lifting upwardly upon said seat base, said first and second cross bars are caused to pivot about said pivot axis and move in the scissor action to pull said left and right frame members inwardly from said open, operable position to said collapsed position, and further wherein said first and second cross bars are adapted to pivot about said pivot axis in the scissor action to move said left and right frame members outwardly, away from one another, from said collapsed position to said open, operable position upon application of a downward force on either of said left and right seat support bars.

3. The portable chair as recited in claim 2 further comprising pocket means for holding a plurality of articles therein.

4. The portable chair as recited in claim 3 wherein said pocket means is provided on a flap extending on a side of said chair.

5. The portable chair as recited in claim 4 wherein said pocket means is provided on both left and right flaps extending and hanging on outboard sides of said left and right frame members respectively.

6. The portable chair as recited in claim 5 wherein said frame structure further comprises:

left and right upper horizontal support bars extending between said forward and rear vertical leg posts of said respective left and right frame members and defining arm rests on each side of the chair.

7. The portable chair as recited in claim 6 wherein said frame structure further comprises:

left and right lower horizontal supports attached to and extending between said forward and rear vertical leg posts of said respective left and right frame members.

8. The portable chair as recited in claim 7 further comprising a shoulder strap removably attachable to said frame structure to facilitate carrying of the chair when in said collapsed position.

9. A portable chair comprising:

a corrosion-resistant frame structure comprising:
   a left frame member;
   a right frame member;
   said left and right frame members each including a forward vertical leg post and a rear vertical leg post, and said forward and rear vertical leg posts of said left and right frame members each terminating at a bottom distal end; and
   movement means for permitting lateral movement of said left and right frame members relative to one another between a collapsed position and an open, operable position wherein said frame members are positioned further apart from one another than when in said collapsed position;

disk-shaped feet members on said bottom distal ends of each of said forward and rear vertical leg posts, said disk-shaped feet members being structured and disposed to engage an underlying ground surface in a manner which supports said frame structure in an upright, free standing position when said left and right frame members are in both said open, operable position and said closed position;

a seat base formed of a flexible material web extending and connecting between said respective left and right frame members; a seat back panel formed of a flexible material web extending and connecting between said left and right frame members;

umbrella support means on said frame structure for supporting at least one umbrella in an upright, operable position;

fishing rod support means on said frame structure for holding and supporting at least one fishing rod;

beverage holder means on said frame structure for holding a beverage; and drain means for facilitating drainage of water from within said frame structure.

10. The portable chair as recited in claim 9 wherein said movement means comprises:

first and second cross bars pivotally connected at a central pivot axis and movable in a scissor action about said pivot axis, said first and second cross bars including lower distal end zones and upper distal end zones;

left and right seat support bars each extending between said forward vertical leg post and said rear vertical leg post of said respective left and right frame members, and said left and right seat support bars being slidable throughout a range of vertical motion relative to said forward and rear vertical leg posts;

pivotal coupling means for pivotally connecting said upper distal end zones of said respective first and second cross bars to said left and right seat support bars, respectively;

rotating coupling means for rotatably coupling said lower distal end zones of said respective first and second cross bars to said left and right frame members, respectively; and said seat base being attached to said left and right seat support bars so that upon lifting upwardly upon said seat base, said first and second cross bars are caused to pivot about said pivot axis and move in the scissor action to pull said left and right frame members inwardly from said open, operable position to said collapsed position, and further wherein said first and second cross bars are adapted to pivot about said pivot axis in the scissor action to move said left and right frame members outwardly, away from one another, from said collapsed position to said open, operable position upon application of a downward force on either of said left and right seat support bars.

11. The portable chair as recited in claim 10 further comprising pocket means for holding a plurality of articles therein.

12. The portable chair as recited in claim 11 wherein said pocket means is provided on a flap extending on a side of said chair.

13. The portable chair as recited in claim 12 wherein said pocket means is provided on both left and right flaps extending and hanging on outboard sides of said left and right frame members respectively.

14. The portable chair as recited in claim 13 wherein said frame structure comprises:

hollow tubular sections formed of polyvinyl chloride; and drain means for facilitating drainage of water from within said hollow tubular sections.

15. The portable chair as recited in claim 14 wherein said frame structure further comprises:

left and right upper horizontal support bars extending between said forward and rear vertical leg posts of said respective left and right frame members and defining arm rests on each side of the chair.

16. The portable chair as recited in claim 15 wherein said frame structure further comprises:

left and right lower horizontal supports attached to and extending between said forward and rear vertical leg posts of said respective left and right frame members.

17. A portable chair comprising:

a corrosion-resistant frame structure including a left frame member and a right frame member;

said left and right frame members each including a forward vertical leg post and a rear vertical leg post, and said forward and rear vertical leg posts of said left and right frame members each terminating at a bottom distal end;

a seat base formed of a flexible material web extending and connecting between said respective left and right frame members;

a seat back panel formed of a flexible material web extending and connection between said respective left and right frame members; and movement means for permitting lateral movement of said left and right frame members relative to one another between a collapsed position and an open, operable position wherein said frame members are positioned further apart from one another than when in said collapsed position, said movement means comprising:

first and second cross bars pivotally connected at a central pivot axis and movable in a scissor action about said pivot axis, said first and second cross bars including lower distal end zones and upper distal end zones;

left and right seat support bars each extending between said forward vertical leg post and said rear vertical leg post of said respective left and right frame members, and said left and right seat support bars being slidable throughout a range of vertical motion relative to said forward and rear vertical leg posts;

pivotal coupling means for pivotally connecting said upper distal end zones of said respective first and second cross bars to said left and right seat support bars, respectively;

rotating coupling means for rotatably coupling said lower distal end zones of said respective first and second cross bars to said left and right frame members, respectively; and said seat base being attached to said left and right seat support bars so that upon lifting upwardly upon said seat base, said first and second cross bars are caused to pivot about said pivot axis and move in the scissor action to pull said left and right frame members inwardly from said open, operable position to said collapsed position, and further wherein said first and second cross bars are adapted to pivot about said pivot axis in the scissor action to move said left and right frame members outwardly, away from one another, from said collapsed position to said open, operable position upon application of a downward force on either of said left and right seat support bars;

disk-shaped feet members on said bottom distal ends on each of said forward and rear vertical leg posts, said disk-shaped feet members being structured and disposed to engage an underlying ground surface in a manner which supports said frame structure in an upright, free-standing position when said left and right frame members are in both said open, operable position and said collapsed position; and drain means for facilitating drainage of water from within said frame structure.

* * * * *